(12) United States Patent
Kim et al.

(10) Patent No.: US 8,023,924 B2
(45) Date of Patent: Sep. 20, 2011

(54) METHOD FOR REDUCING POWER CONSUMPTION IN A MULTI-USER DIGITAL COMMUNICATION SYSTEM AND MOBILE STATION EMPLOYING THE METHOD

(75) Inventors: Youhan Kim, Albany, CA (US); Won-Joon Choi, Cupertino, CA (US)

(73) Assignee: Amicus Wireless Technology Ltd. (KY)

( * ) Notice: Subject to any disclaimer, the term of this patent is extended or adjusted under 35 U.S.C. 154(b) by 526 days.

(21) Appl. No.: 12/271,821

(22) Filed: Nov. 14, 2008

(65) Prior Publication Data

US 2009/0129304 A1    May 21, 2009

Related U.S. Application Data (60) Provisional application No. 61/003,295, filed on Nov. 16, 2007.

(51) Int. Cl.
*H04B 1/16* (2006.01)

(52) U.S. Cl. .................. 455/343.4; 455/343.1
(58) Field of Classification Search .............. None
See application file for complete search history.

(56) References Cited

U.S. PATENT DOCUMENTS

| 6,463,050 | B1 * | 10/2002 | Nagashima | 370/347 |
| 6,535,752 | B1 * | 3/2003 | Dent | 455/574 |
| 7,020,110 | B2 * | 3/2006 | Walton et al. | 370/334 |
| 2004/0203397 | A1 * | 10/2004 | Yoon et al. | 455/63.1 |
| 2008/0232489 | A1 * | 9/2008 | Tsai et al. | 375/260 |

* cited by examiner

*Primary Examiner* — Cassandra Cox
(74) *Attorney, Agent, or Firm* — Thomas H. Ham; Wilson & Ham (57) ABSTRACT

A method for reducing power consumption in a multi-user digital communication system and mobile station employing the method adjusts receive and transmit mode durations of the mobile device using downlink and uplink allocations from a base station of the system, as well as other factors.

20 Claims, 4 Drawing Sheets

METHOD FOR REDUCING POWER CONSUMPTION IN A MULTI-USER DIGITAL COMMUNICATION SYSTEM AND MOBILE STATION EMPLOYING THE METHOD

CROSS REFERENCE TO RELATED APPLICATION

This application is entitled to the benefit of U.S. Provisional Patent Application Ser. No. 61/003,295, filed on Nov. 16, 2007, which is incorporated herein by reference.

BACKGROUND OF THE INVENTION

Orthogonal Frequency Division Multiple Access (OFDMA) technology can efficiently support multiple mobile stations with limited bandwidth and easily provide various Quality of Service (QoS). The OFDMA technology is a multiple access version of orthogonal frequency-division multiplexing (OFDM). OFDM is a modulation technique for data transmission based on frequency-division multiplexing (FDM), which uses different frequency channels to transmit multiple streams of data. In OFDM systems, a wide channel is divided into multiple narrow-band subcarriers, which allow orthogonal modulated streams of data to be transmitted in parallel on the subcarriers.

In OFDMA systems, the channel resource is divided into multiple time domain OFDMA symbols, with each OFDMA symbol partitioned into multiple narrow-band subcarriers. A base station (BS) allocates a subset of subcarriers in selected OFDMA symbols to each mobile station (MS) based on appropriate scheduling algorithms, enabling multiple MSs to share the channel resource in both frequency and time domain.

Since MSs are typically implemented as portable devices running on batteries, one of the most critical considerations in MS design is power consumption. Although various power saving techniques have been developed for communication systems, there is a need for a method of reducing power consumption in a multi-user digital communication system and a mobile station employing the method.

SUMMARY OF THE INVENTION

A method for reducing power consumption in a multi-user digital communication system and mobile station employing the method adjusts receive and transmit mode durations of the mobile device using downlink and uplink allocations from a base station of the system, as well as other factors. By efficiently adjusting the receive and transmit mode durations of the mobile device, the power consumption of the mobile device is significantly reduced.

A method for reducing power consumption in a mobile station of a multi-user digital communication system in accordance with an embodiment of the invention comprises setting the ending time of a receive mode duration of the mobile station for a subsequent frame to a first ending time that equals the ending time of the maximum downlink duration for the subsequent frame, changing the ending time of the receive mode duration of the mobile station for the subsequent frame to a second ending time in response to uplink resource allocation information regarding the subsequent frame received during the current frame from a base station of the multi-user digital communication system, changing the ending time of the receive mode duration of the mobile station in the subsequent frame to a third ending time in response to downlink resource allocation information received during the subsequent frame from the base station, and selectively enabling components of the mobile station during the receive mode duration to reduce the power consumption of the mobile station.

A mobile station for a multi-user digital communication system in accordance with an embodiment of the invention comprises an antenna to receive incoming signals and transmit outgoing signals, a plurality of receiving components configured to receive the incoming signals from the antenna, a plurality of transmitting components configured to transmit the outgoing signals to the antenna, a power saving controller operatively connected to at least some of the receiving and transmitting components. The power saving controller is configured to set the ending time of a receive mode duration of the mobile station for a subsequent frame to a first ending time that equals the ending time of the maximum downlink duration for the subsequent frame. The power saving controller is further configured to change the ending time of the receive mode duration of the mobile station for the subsequent frame to a second ending time in response to uplink resource allocation information regarding the subsequent frame received during the current frame from a base station of the multi-user digital communication system. The power saving controller is further configured to change the ending time of the receive mode duration of the mobile station for the subsequent frame to a third ending time in response to downlink resource allocation information received during the subsequent frame from the base station. The power saving controller is further configured to selectively enable components of the mobile station during the receive mode duration to reduce the power consumption of the mobile station.

Other aspects and advantages of the present invention will become apparent from the following detailed description, taken in conjunction with the accompanying drawings, illustrated by way of example of the principles of the invention.

DETAILED DESCRIPTION

Figure 1:
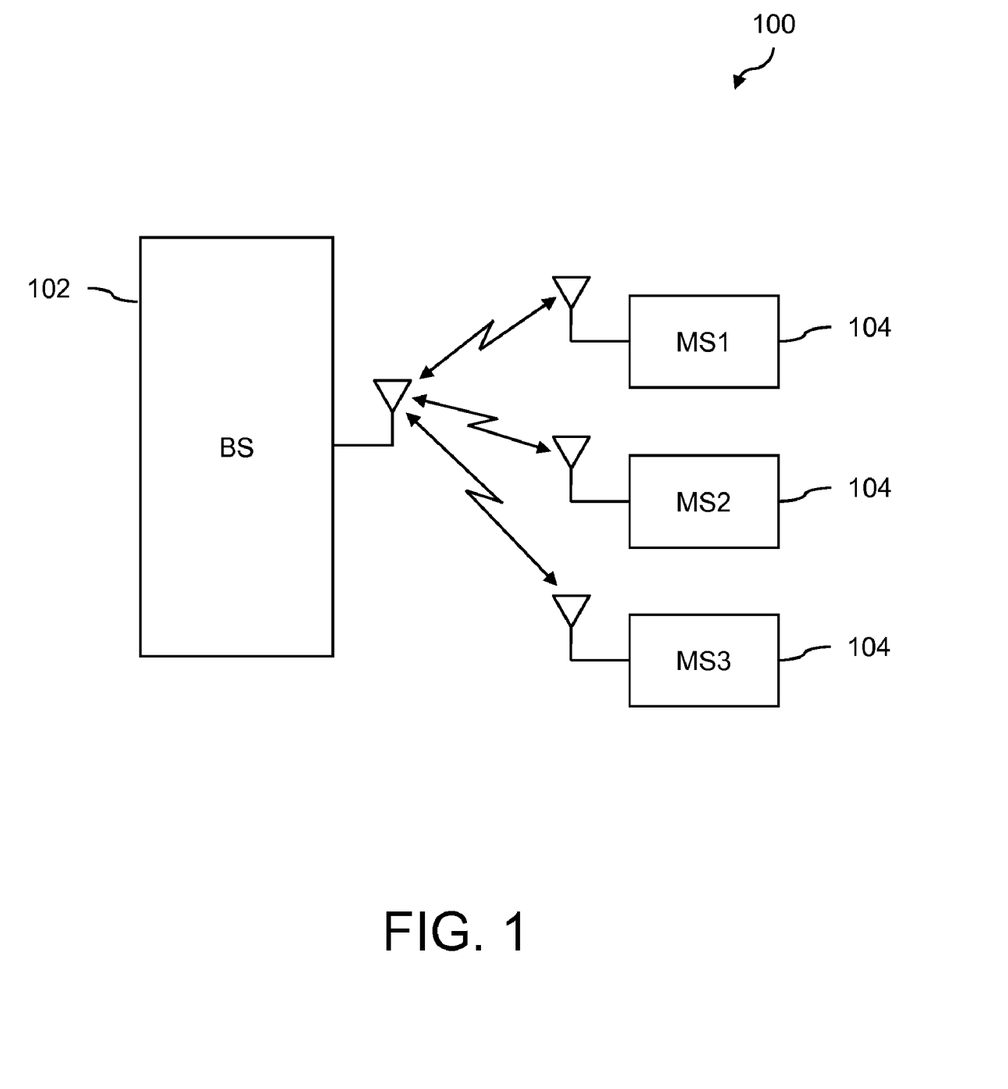
FIG. 1 is a diagram of a multi-user digital communication system in accordance with an embodiment of the invention.

With reference to FIG. 1, a multi-user digital communication system 100 in accordance with an embodiment of the invention is described. The multi-user digital communication system 100 includes a base station (BS) 102 and a number of mobile stations (MSs) 104, MS1, MS2 and MS3. The MSs 104 may be implemented as portable electronic devices, such as laptop computers or handheld electronic devices. Although only a single BS and three MSs are shown in FIG. 1, the multi-user digital communication system 100 may include any number of BSs and MSs. In the illustrated embodiment, the multi-user digital communication system 100 is an Orthogonal Frequency Division Multiple Access (OFDMA) communication system. However, in other embodiments, the Orthogonal Frequency Division Multiple Access (OFDMA)

system 100 may be any time-division duplex (TDD) based communication system. In operation, the BS allocates the channel resource so that the MSs can share the channel resource in both frequency and time domain.

In order to optimize the channel resource utilization as a function of various time varying parameters, such as the amount of data to transmit/receive to and from each MS 104, channel quality, etc., the BS 102 needs to vary the resource allocation between multiple MSs 104 as a function of time. Therefore, BS 102 periodically broadcasts the resource allocation to each MS 104. In TDD-based systems, the BS 102 may also dynamically vary the downlink (DL) to uplink (UL) time duration ratio as a function of the amount of data in DL and UL. Furthermore, an MS 104 may be required to measure the signal quality of the received signals for channel adaptation purposes.

Consequently, the duration for which each MS 104 must perform signal reception and transmission will dynamically vary. For applications which are sensitive to power consumption, such as portable devices running on batteries, it is imperative that the MS 104 adaptively turns on and off the necessary modules or components per need basis in order to minimize the power consumption. The MSs 104 in accordance with an embodiment of the invention are configured to adaptively control the various modules or components in the MSs in order to minimize the power consumption as a function of the dynamic resource allocation made by the BS 102.

Figure 2:
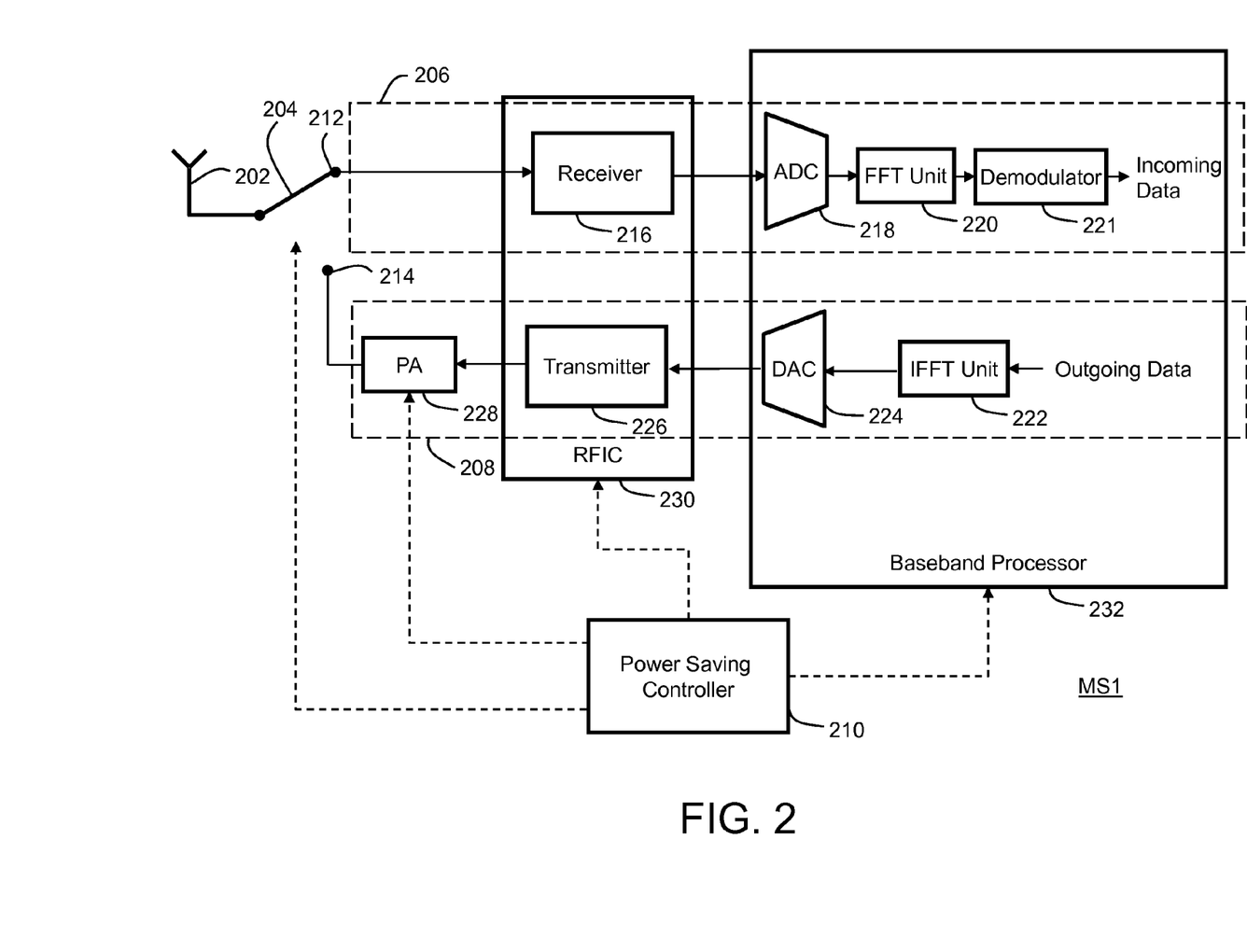
FIG. 2 is a block diagram of a mobile station of the multi-user digital communication system in accordance with an embodiment of the invention.

Turning now to FIG. 2, the MS1 in accordance with an embodiment of the invention is shown in more detail, as an example of the MSs 104. As illustrated in FIG. 2, the MS1 includes an antenna 202, an antenna switch 204, a number of receiving components 206, a number of transmitting components 208, and a power saving controller 210. The antenna 202, the antenna switch 204, the receiving components 206, and the transmitting components 208 are conventional components commonly found in an OFDMA MS, and thus, are not described herein in detail.

The antenna 202 is used to receive incoming radio frequency (RF) signals and to transit outgoing RF signals. The antenna switch 204 is connected to the antenna 202. The antenna switch 204 is configured to selectively connect the antenna to either a receive node 212 for reception of the incoming RF signals or a transmit node 214 for transmission of the outgoing RF signals. The receiving components 206 are configured to process the incoming RF signals received from the antenna 202 to extract incoming data in the incoming RF signals. The transmitting components 208 are configured to process outgoing data to transmit the outgoing data in the outgoing RF signals transmitted from the antenna 202.

As shown in FIG. 2, the receiving components 206 include an RF receiver 216, an analog-to-digital converter (ADC) 218, a fast Fourier transform (FFT) unit 220 and a baseband digital demodulator 221. The receiving components 206 also include other receiving components that are commonly found in an OFDMA MS. However, these other components are not illustrated and described herein so as to not obscure the inventive features of the MS1. The RF receiver 216 is configured to demodulate the incoming RF signals from the antenna 202. The RF receiver 216 is also configured to filter and down convert the RF-demodulated signals to baseband signals. The RF receiver 216 may also be configured to amplify the signals being processed. The ADC 218 is configured to convert the baseband signals from analog signals to digital signals. The FFT unit 220 is configured to apply FFT on N received samples per OFDMA symbol to generate N received subcarriers per OFDMA symbol in the frequency domain. The baseband digital demodulator 221 is configured to demodulate the output of the FFT unit 220 to extract the incoming data.

The transmitting components 208 include an inverse fast Fourier transform (IFFT) unit 222, a digital-to-analog converter (DAC) 224, an RF transmitter 226, and a power amplifier (PA) 228. The transmitting components 208 also include other transmitting components that are commonly found in an OFDMA MS. However, these other components are not illustrated and described herein so as to not obscure the inventive features of the MS1.

The IFFT unit 222 is configured to apply IFFT on the outgoing data to transform the N subcarriers into time-domain so that the OFDMA symbols will be suitable for sending through a wireless environment. The DAC 224 is configured to convert the transformed signals from digital signals to analog signals. The RF transmitter 226 is configured to modulate the outgoing signals. The RF transmitter 226 is also configured to filter and up convert the modulated outgoing signals. The power amplifier 228 is configured to amplify the resulting signals for wireless transmission via the antenna 202.

In the illustrated embodiment, the RF receiver 216 and the RF transmitter 226 are integrated into a radio frequency integrated circuit (RFIC) 230. The RFIC may include additional receiver(s) for multi-input multi-output (MIMO) communication, which would require additional antennas. In the illustrated embodiment, the ADC 218, the FFT unit 220, the IFFT unit 222, and the DAC 224 may be integrated into a baseband processor 232. The baseband processor 232 includes various other components for performing different operations, such as channel estimation.

The power saving controller 210 is configured to dynamically determine receive mode durations to receive signals from the BS 102 and/or any other BS and transmit mode durations to transmit signals to the BS 102 and/or any other BS for each frame, which includes a DL duration followed by a UL duration. As described below, the determination of the receive and transmit mode durations for each frame is based on information received from the BS 102, as well as other factors. The power saving controller 210 is further configured to selectively activate or deactivate components of the MS1 according to the determined receive and transmit durations.

Figure 3:
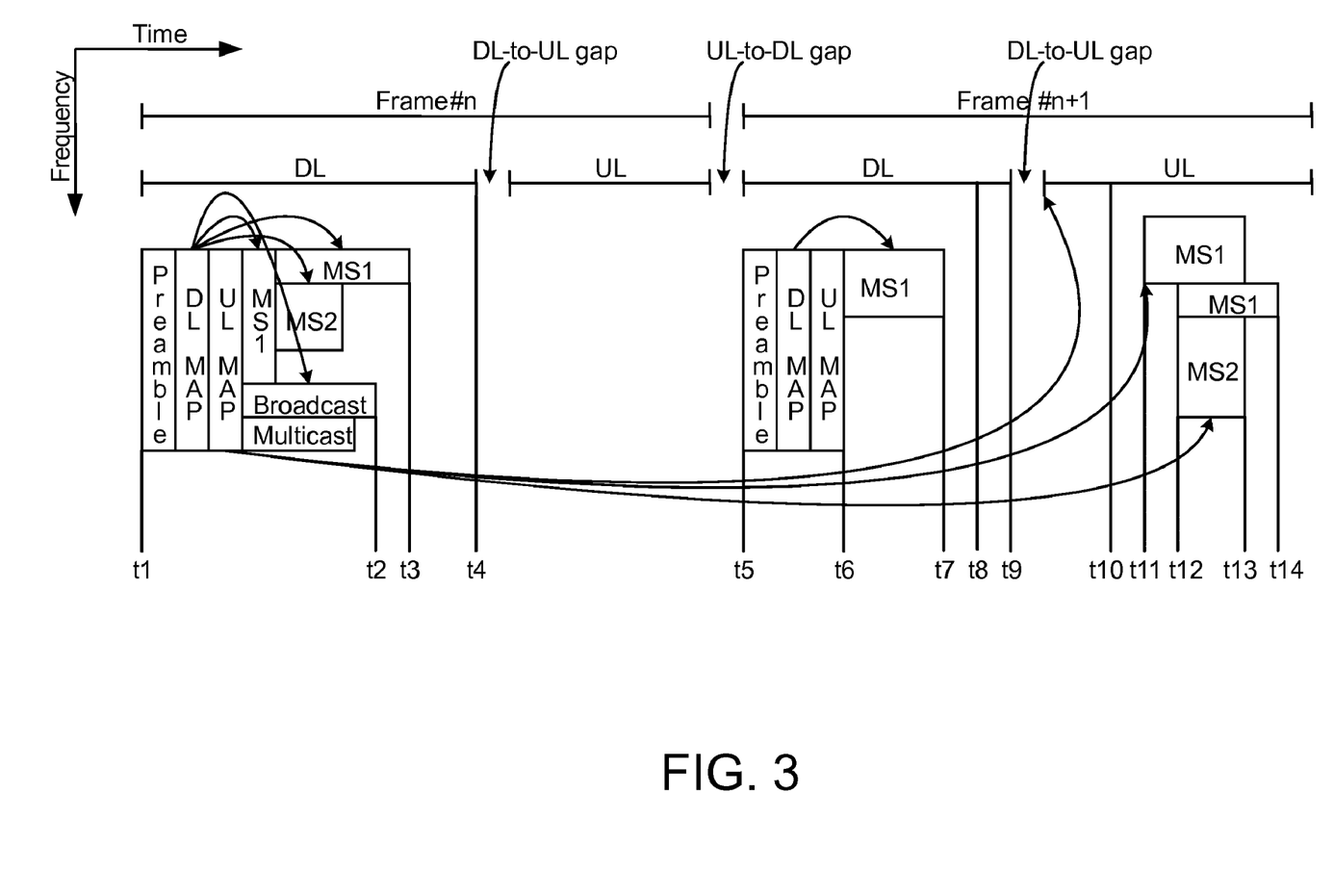
FIG. 3 illustrates an example of downlink and uplink allocations for two frames in accordance with an embodiment of the invention.

In the illustrated embodiment, the power saving controller 210 is a separate independent component. However, the power saving controller 210 may be part of another components, such as the baseband processor or a microcontroller (not shown) of the MS1. The power saving controller 210 can be implemented in any combination of software, hardware and/or firmware. The operation of the power saving controller 210 is described with reference to FIG. 3, which illustrates two consecutive frames, Frame #n and Frame #n+1. Each frame includes a DL duration followed by a UL duration. Each DL duration starts with a preamble symbol. Furthermore, each DL duration contains messages indicating the resource allocation in the current DL duration in the current frame. For convenience, these messages shall be referred to herein as "DL-MAP". Each DL duration also contains messages indicating the resource allocation in a UL duration. These messages shall be referred to as "UL-MAP". The UL duration associated with the UL-MAP may differ from system to system. FIG. 3 shows an example in which the UL-MAP is associated with the UL duration of the next frame.

At the start of each frame, the power saving controller 210 sets the receive mode duration of the MS1 for the next frame to begin at the start of the next frame and to end at an ending time corresponding to the end of the longest possible DL duration for the next frame, which is the default receive mode duration. Thus, the receive mode duration of the MS1 for the next frame corresponds to the longest (maximum) DL duration for the next frame. Based on the receive mode duration, the power saving controller 210 schedules the MS1 such that the MS1 will go into the receive mode at the start of the next frame. The receive mode for the MS1 involves, but not limited to:

setting the antenna switch 204 to receive mode, i.e., connecting the antenna to the receive node 212;
   enabling or activating the RF receiver 216;
   enabling or activating the ADC 218;
   enabling the baseband digital demodulator 221; and
   setting the number of OFDMA symbols to be processed by the FFT unit 220 in the next frame to the number of symbols corresponding to the set receive mode duration, i.e., the longest possible DL duration.

The above operations are performed at or prior to the start of the DL duration in the next frame. Each of the enabling should be scheduled sufficiently before the start of the next frame to allow setup time for each of the components (e.g. ADC settling).

The setting of the receive mode duration to the default receive mode duration is now described using the example shown in FIG. 3. At the start of Frame #n, the power saving controller 210 schedules the following actions to occur prior to t=t5:

set the antenna switch 204 to receive mode, i.e., connecting the antenna to the receive node 212;
   enable the RF receiver 216;
   enable the ADC 218;
   enable the baseband digital demodulator 221; and
   set the end of the receive mode duration for the next frame to t=t10; and
   set the number of OFDMA symbols to be processed by the FFT unit 220 in the next frame to the number of symbols corresponding to the receive mode duration for the next frame, i.e., from t=t5 to t=t10.

Upon decoding the UL-MAP (or any other message which contains information on the DL to UL ratio of a future frame), the power saving controller 210 will change the ending time of the receive mode duration for the next frame according to the DL to UL ratio specified in the message. Furthermore, the power saving controller 210 will set the number of OFDMA symbols to be processed by the FFT unit 220 in the next frame to the number of symbols corresponding to the adjusted receive mode duration.

The operation of the power saving controller 210 in response to the UL-MAP in the previous frame is now described using the example shown in FIG. 3. As described above, the power saving controller 210 has previously set the receive mode duration for Frame #n+1 to end at t=t10. Upon decoding the UL-MAP in Frame #n, the power saving controller 210 will change the receive mode duration of the next frame to end at t=t9 according to the DL to UL ratio regarding Frame #n+1 specified in UL-MAP received in Frame #n. In addition, the power saving controller 210 will set the number of OFDMA symbols to be processed by the FFT unit 220 in the next frame to the number of symbols corresponding to t9.

Upon decoding the UL-MAP (or any other broadcast messages which contains information on the resource allocation in the corresponding UL duration), the power saving controller 210 checks to determine if there are any UL allocations made to the MS1. In addition, the power saving controller 210 checks to determine if there are any UL signals to be transmitted by the MS1 without any explicit allocations from the BS 102. These include, but not limited to, contention based signal transmission (e.g. random access signals used for network entry,) periodic UL allocations made in some previous frame, and implicit UL allocations such as ACK/NACK transmission as a response to HARQ transmission in the DL.

If there is nothing to transmit in the UL duration, then the power saving controller 210 does not take any action. Thus, all components related to transmission will remain turned off during the corresponding UL duration. However, if there is something to transmit in the UL duration, then the power saving controller 210 finds the first symbol among all UL signals to be transmitted by the MS1. The starting time of this symbol will be referred to herein as T_ul_start. Also, the power saving controller 210 finds the last symbol among all UL signals to be transmitted by the MS1. The end time of this symbol is referred to herein as T_ul_end. Then, the power saving controller 210 schedules to perform the following:

enable the DAC 224 at T_ul_start (taking into consideration DAC ramp-up on time minus DAC delay, RF transmitter delay and power amplifier (PA) delay);
   enable the RF transmitter 226 at T_ul_start (taking into consideration RF transmitter ramp-up time, RF transmitter delay and PA delay);
   enable the PA 228 at T_ul_start (taking into consideration PA ramp up time and PA delay);
   set the antenna switch 204 to a transmit mode at T_ul_start (taking into consideration antenna switch settling time);
   set the antenna switch 204 to a receive mode at T_ul_end (taking into consideration PA ramp down time, DAC delay, RF transmitter delay and PA delay);
   disable the PA 228 at T_ul_end (taking into consideration DAC delay, RF transmitter delay and PA delay);
   disable the RF transmitter 226 at T_ul_end (taking into consideration DAC delay and RF transmitter delay); and
   disable the DAC 224 at T_ul_end (taking into consideration DAC delay).

The operation of the power saving controller 210 in response to the UL-MAP (or any other broadcast messages which contains information on the resource allocation in the corresponding UL duration) in the previous frame is now described using the example shown in FIG. 3. Suppose the UL-MAP in Frame #n indicates that there is one UL allocation for the MS1 in Frame #n+1, starting at t11 and ending at t13. Also, suppose that there is one more UL signal to be transmitted by the MS1 in Frame #n+1, starting at t12 and ending at t14. Then, the power saving controller 210 will set T_ul_start=min(t11, t12)=t11 and T_ul_end=max(t13, t14)=t14 for the MS1. The power saving controller 210 then schedules to enable the DAC 224, the RF transmitter 226 and the PA 228 and to set the antenna switch 204 to the transmit mode prior to t11. The power saving controller 210 also schedules to disable the DAC 224, the RF transmitter 226 and the PA and to set the antenna switch 204 to the receive mode after t14.

Upon decoding the DL-MAP (and any other messages which may contain information on the resource allocation in the DL duration), the power saving controller 210 calculates the last OFDMA symbol to be processed by the MS1 considering all broadcast, multicast and unicast allocations the MS1 should decode. The ending time of this symbol will be referred to herein as T_alloc_end. In addition, the power saving controller 210 calculates the last OFDMA symbol to be used for channel quality measurement (e.g. signal-to-noise ratio (SNR) measurement). The ending time of this symbol will be referred to herein as T_measure_end. The power saving controller 210 selects the later time of Talloc_end and T_measure_end, which is referred to herein as T_end, as the new ending time for the receive mode duration of the MS1 for the current frame, i.e., the same frame during which the DL-MAP was decoded. The power saving controller 210 then schedules the MS1 such that the following actions take place at T_end:
- disable the RF receiver 216;
- disable the ADC 218; and
- instruct the FFT unit 220 to only process symbols up to T_end.

However, if by the time the MS1 has computed T_end and T_end has already passed, the power saving controller 210 then directs the following actions to occur immediately:
- disable the RF receiver 216;
- disable the ADC 218; and
- instruct the FFT unit 220 to stop processing any more symbols.

The operation of the power saving controller 210 in response to the DL-MAP in the current frame is now described using the example shown in FIG. 3. According to the DL-MAP in Frame #n, the MS1 has to demodulate one UL-MAP, one broadcast, one multicast, and two unicast allocations (indicated as "MS1" in FIG. 3) in Frame #n. Then, the power saving controller 210 will set T_alloc_end=t3. If the MS1 1094 is not required to measure the channel quality in Frame #n, then the power saving controller 210 will set T_end=T_alloc_end=t3. Thus, the power saving controller 210 will disable the RF receiver 216 and the ADC 218 at t=t3. Also, the power saving controller 210 will instruct the FFT unit 220 to not perform FFT on symbols coming after t3.

According to the DL-MAP in Frame #n+1, the MS1 has to demodulate one UL-MAP and one unicast allocation in Frame #n+1. Then, the power saving controller will set T_alloc_end=t7. Suppose the MS1 is required to measure the channel quality up to T_measure_end=t8. Then, the power saving controller 210 will set T_end=max(T_alloc_end, T_measure_end)=t8. Thus, power saving controller 210 will disable the RF receiver 216 and the ADC 218 at t8. Also, the power saving controller 210 will instruct the FFT unit 220 to not perform FFT on symbols coming after t8.

According to the DL-MAP in Frame #n+1, the MS2 has to demodulate only the UL-MAP in Frame #n+1. Then, the power saving controller in the MS2 will set T_alloc_end=t6. Suppose the MS2 is not required to measure the channel quality in Frame #n+1. Then, the power saving controller of the MS2 will set T_end=t6. However, suppose the MS2 has finished decoding the DL-MAP at t7. Then, the power saving controller of the MS2 should immediately disable the RF receiver and the ADC of the MS2. Also, the power saving controller of the MS2 will instruct the FFT unit of the MS2 to not perform FFT on any more symbols. The power saving controller 210 will operate in the same manner under the above conditions.

If at some point the power saving controller 210 determines that the MS1 is required to process only the preamble symbol in the next frame (such as while scanning neighbor BS), then the power saving controller 210 sets the end of the receive mode duration for the next frame to be equivalent to the duration of the preamble. Thus, the power saving controller 210 then sets the number of OFDMA symbols to be processed by the FFT unit 220 in the next frame to the number of symbols corresponding to the preamble. Furthermore, the power saving controller 210 sets the RF receiver 216 to be disabled at the end of the preamble in the next frame. The power saving controller 210 also sets the ADC 218 to be disabled at the end of the preamble in the next frame.

Figure 4:
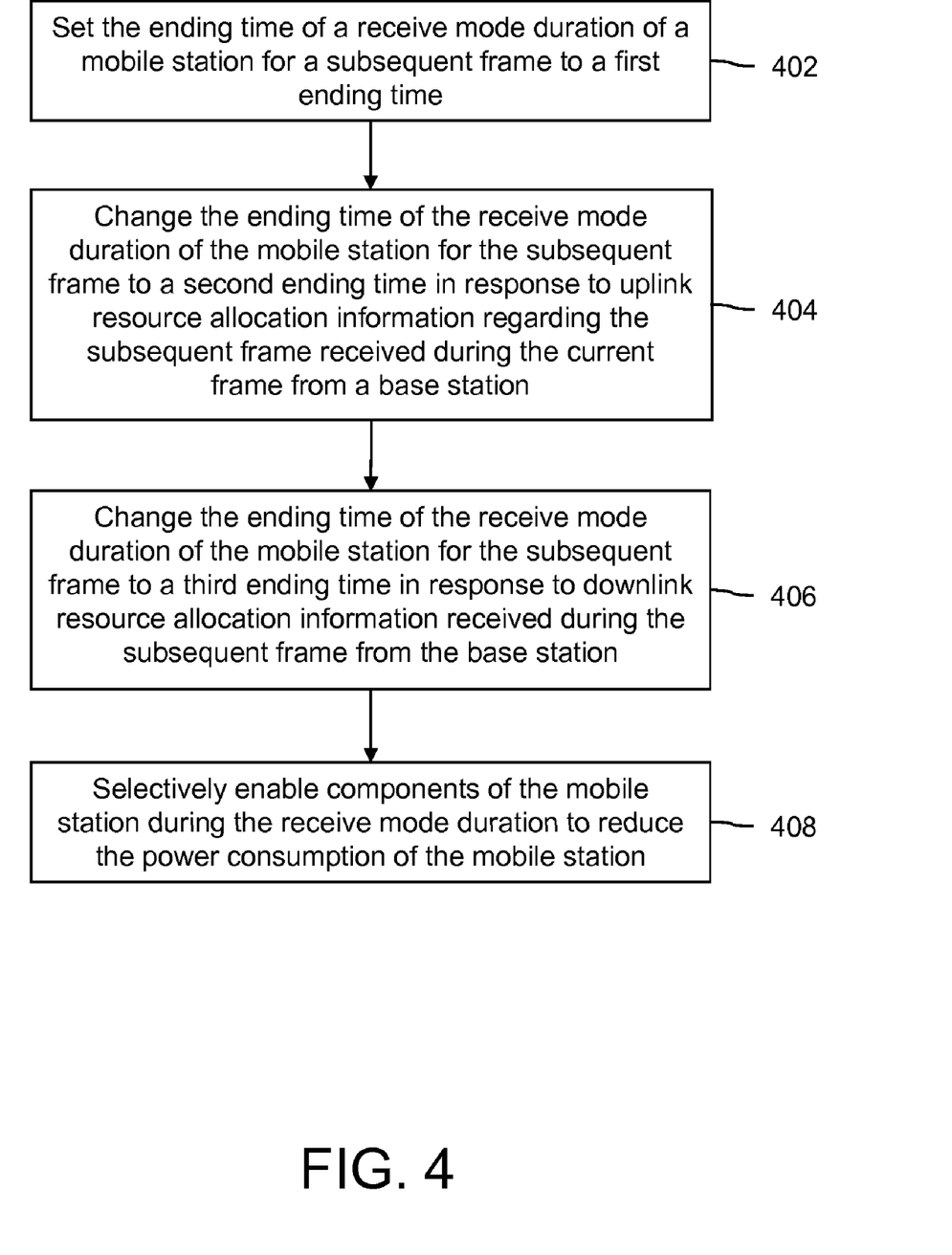
FIG. 4 is a process flow diagram of a method for reducing power consumption of a mobile station for a multi-user digital communication system in accordance with an embodiment of the invention.

A method for reducing power consumption in a mobile station of a multi-user digital communication system in accordance with an embodiment of the invention is described with reference to a process flow diagram of FIG. 4. At block 402, the ending time of a receive mode duration of the mobile station for a subsequent frame is set to a first ending time that equals the ending time of the maximum downlink duration for the subsequent frame. At block 404, the ending time of the receive mode duration of the mobile station for the subsequent frame is changed to a second ending time in response to uplink resource allocation information regarding the subsequent frame received during the current frame from a base station of the multi-user digital communication system. At block 406, the ending time of the receive mode duration of the mobile station for the subsequent frame is changed to a third ending time in response to downlink resource allocation information received during the subsequent frame from the base station. At block 408, components of the mobile station is selectively enabled during the receive mode duration to reduce the power consumption of the mobile station.

Although specific embodiments of the invention have been mentioned, the invention is not limited to the specific forms or arrangements of parts that are described and illustrated here. The scope of the invention is defined by the claims presented herein and their equivalents.

What is claimed is:

1. A method for reducing power consumption in a mobile station of a multi-user digital communication system, the method comprising:
   setting the ending time of a receive mode duration of the mobile station for a subsequent frame to a first ending time that equals the ending time of the maximum downlink duration for the subsequent frame;
   changing the ending time of the receive mode duration of the mobile station for the subsequent frame to a second ending time in response to uplink resource allocation information regarding the subsequent frame received during the current frame from the base station; and
   changing the ending time of the receive mode duration of the mobile station for the subsequent frame to a third ending time in response to downlink resource allocation information received from a base station of the multi-user digital communication system during the subsequent frame;
   selectively enabling components of the mobile station during the receive mode duration to reduce the power consumption of the mobile station.

2. The method of claim 1 wherein the selectively enabling includes at least enabling a radio frequency receiver, an analog-to-digital converter and a baseband digital demodulator of the mobile station.

3. The method of claim 1 further comprising setting the number of symbols to be processed by a fast Fourier transform unit of the mobile station in the subsequent frame that corresponds to the ending time of the receive mode duration of the mobile station for the subsequent frame.

4. The method of claim 1 wherein the changing the ending time of the receive mode duration of the mobile station for the subsequent frame to the second ending time includes changing the ending time of the receive mode duration of the mobile station for the subsequent frame to the second ending time according to the downlink to uplink ratio of the subsequent frame specified in the uplink resource allocation information regarding the subsequent frame received during the current frame.

5. The method of claim 1 further comprising:
   determining if there are any uplink signals to be transmitted by the mobile station for the subsequent frame using the uplink resource allocation information received during the current frame from the base station;

determining if there are any uplink signals to be transmitted by the mobile station without any explicit allocation from the base station; and setting a transmit mode duration only if there is something to transmit during the subsequent frame.

6. The method of claim 1 wherein the changing the ending time of the receive mode duration of the mobile station for the subsequent frame to the third ending time includes calculating the ending time of a first last symbol to be decoded during the subsequent frame and calculating the ending time of a second last symbol to be decoded during the subsequent frame, the first last symbol being the last symbol to be processed by the mobile station considering all broadcast, multicast and unicast allocations that the mobile station should decode during the subsequent frame based on the downlink resource allocation information received in the subsequent frame, the second last symbol being the last symbol to be used for channel quality measurement, the later time of the ending time of the first last symbol and the ending time of the second last symbol being selected as the third ending time of the receive mode duration.

7. The method of claim 6 further comprising terminating the receive mode duration if the third ending time of the receive mode duration has already passed by the time the third ending time has been computed using the later time of the ending time of the first last symbol and the ending time of the second last symbol.

8. The method of claim 7 wherein the terminating the receive mode duration includes disabling at least a radio frequency receiver and an analog-to-digital converter of the mobile station and instructing a fast Fourier transform unit of the mobile station to stop fast Fourier transform processing of any more symbols.

9. The method of claim 1 further comprising:

if at some point in time the mobile station determines that the mobile station is required to process only a preamble symbol, setting at least a radio frequency receiver and an analog-to-digital converter of the mobile station to be disabled at the end of the preamble symbol in the next frame and setting the number of symbols to be processed by a fast Fourier transform unit of the mobile station equal to the number of preamble symbols.

10. The method of claim 1 wherein the mobile station is configured to transmit and receive signals according to Orthogonal Frequency Division Multiple Access (OFDMA).

11. A mobile station for a multi-user digital communication system comprising:

an antenna to receive incoming signals and transmit outgoing signals;

a plurality of receiving components configured to receive the incoming signals from the antenna;

a plurality of transmitting components configured to transmit the outgoing signals to the antenna; and a power saving controller operatively connected to at least some of the receiving and transmitting components, the power saving controller being configured to set the ending time of a receive mode duration of the mobile station for a subsequent frame to a first ending time that equals the ending time of the maximum downlink duration for the subsequent frame, the power saving controller being further configured to change the ending time of the receive mode duration of the mobile station for the subsequent frame to a second ending time in response to uplink resource allocation information regarding the subsequent frame received during the current frame from the base station, the power saving controller being further configured to change the ending time of the receive mode duration of the mobile station for the subsequent frame to a third ending time in response to downlink resource allocation information received from a base station of the multi-user digital communication system during the subsequent frame, the power saving controller being further configured to selectively enable components of the mobile station during the receive mode duration to reduce the power consumption of the mobile station.

12. The mobile station of claim 11 wherein the power saving controller is configured to selectively enable at least a radio frequency receiver, an analog-to-digital converter and a baseband digital demodulator of the mobile station.

13. The mobile station of claim 11 wherein the power saving controller is further configured to set the number of symbols to be processed by a fast Fourier transform unit of the mobile station in the subsequent frame that corresponds to the ending time of the receive mode duration of the mobile station for the subsequent frame.

14. The mobile station of claim 11 wherein the power saving controller is configured to calculate the ending time of a first last symbol to be decoded during the subsequent frame and to calculate the ending time of a second last symbol to be decoded during a frame, the first last symbol being the last symbol to be processed by the mobile station considering all broadcast, multicast and unicast allocations that the mobile station should decode during the frame, the second last symbol being the last symbol to be used for channel quality measurement, the later time of the ending time of the first last symbol and the ending time of the second last symbol being selected as the third ending time of the receive mode duration.

15. The mobile station of claim 14 wherein the power saving controller is further configured to terminate the receive mode duration if the third ending time of the receive mode duration has already passed by the time the third ending time has been computed using the later time of the ending time of the first last symbol and the ending time of the second last symbol.

16. The mobile station of claim 15 wherein the power saving controller is configured to disable at least a radio frequency receiver and an analog-to-digital converter of the mobile station and instructing a fast Fourier transform unit of the mobile station to stop fast Fourier transform processing of any more symbols to terminate the receive mode duration.

17. The mobile station of claim 11 wherein the power saving controller is configured to change the ending time of the receive mode duration of the mobile station for the subsequent frame to the second ending time according to the downlink to uplink ratio for the subsequent frame specified in the uplink resource allocation information regarding the subsequent frame received during the current frame.

18. The mobile station of claim 11 wherein the power saving controller is further configured to determine if there are any uplink signals to be transmitted by the mobile station for the subsequent frame using the uplink resource allocation information regarding the subsequent frame received during the current frame from the base station, to determine if there are any uplink signals to be transmitted by the mobile station without any explicit allocation from the base station, and to set a transmit mode duration only if there is something to transmit during the subsequent frame.

19. The mobile station of claim 11 wherein the power saving controller is configured, if at some point in time the mobile station determines that the mobile station is required to process only a preamble symbol, to set at least a radio frequency receiver and an analog-to-digital converter of the mobile station to be disabled at the end of the preamble symbol in the next frame and to set the number of symbols to be processed by the FFT equal to the number of symbols for the preamble.

20. The mobile station of claim 11 wherein the mobile station is configured to transmit and receive signals according to Orthogonal Frequency Division Multiple Access (OFDMA).

* * * * *